UNITED STATES PATENT OFFICE.

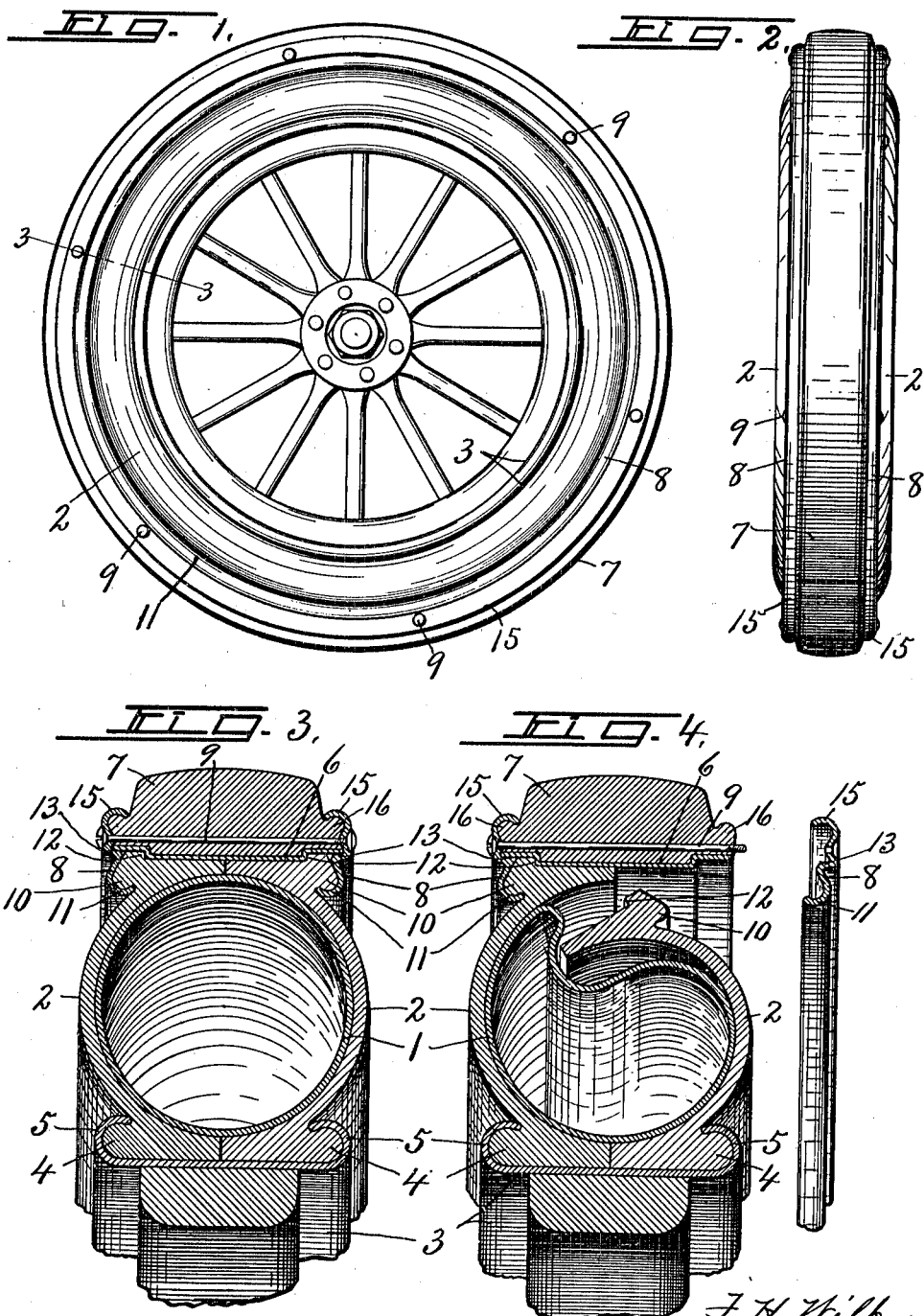

FREDERICK H. WILBUR, OF LESTERSHIRE, NEW YORK.

COMBINED ELASTIC AND PNEUMATIC TIRE.

1,088,860.  Specification of Letters Patent.  Patented Mar. 3, 1914.

Application filed March 27, 1912. Serial No. 686,524.

*To all whom it may concern:*

Be it known that I, FREDERICK H. WILBUR, of Lestershire, in the county of Broome, in the State of New York, have invented new and useful Improvements in Combined Elastic and Pneumatic Tires, of which the following, taken in connection with the accompanying drawings, is a full, clear, and exact description.

This invention relates to certain improvements in combined elastic and pneumatic tires for vehicle wheels involving the use of an inflatable tube and a sectional protective shoe or casing thereon together with a non-puncturable resilient band resting upon the periphery of the casing and an elastic tread surrounding and resting upon the non-puncturable band.

The main object is to provide the pneumatic section of the tire with a separate elastic wearing tread and an interposed non-puncturable band of sheet metal or equivalent material for the purpose not only of protecting the envelop or casing and the inner tube against undue wear or puncture but also to limit the degree of distention or radial expansion of the periphery of the envelop or shoe while being inflated or while in actual use, thereby reducing the liability of blow-outs or unequal distention at different points in the circumference of the tire. In other words I have sought to provide a pneumatic tire of substantially circular cross section with a demountable elastic wearing tread which when worn beyond repair may be easily and quickly replaced with a new tread at a relatively low cost as compared with that of the ordinary pneumatic tire without destroying or even removing the pneumatic section of the tire from the wheel.

Another object is to utilize the non-puncturable band as a reinforcement to stiffen the adjacent portions of the pneumatic and elastic tire sections against undue lateral compression under the tightening action of the clamping rings and bolts by which the elastic tread is attached to the periphery of the pneumatic shoe or casing.

Other objects and uses will be brought out in the following description:

In the drawings—Figures 1 and 2 are respectively an end view and face view of a vehicle wheel equipped with my improved tire. Fig. 3 is an enlarged transverse sectional view through one side of the felly, rim and tire shown in Figs. 1 and 2. Fig. 4 is a view similar to Fig. 3 except that the tube is deflated and a part of the shoe forced inwardly to illustrate the manner of removing the elastic tread and band after one of the clamping rings has been removed.

The tire forming the subject matter of this invention comprises an inner inflatable rubber tube —1— and a somewhat heavier outer envelop of pliable material preferably rubber divided longitudinally and centrally through its inner and outer sides to form similar opposed substantially semi-circular sections —2— which are interchangeable. The inner sides or bases of these casing sections are arranged around and upon the rim as —3— of the wheel and are provided with laterally and outwardly projecting flanges —4— for interlocking engagement with corresponding inturned flanges —5— on said rim to hold the casing sections in operative position thereon particularly when the pneumatic portion of the tire is inflated, it being understood that the meeting edges of the casing sections abut against each other when in operative position.

Surrounding the periphery of the casing sections —2— and normally resting thereon is a comparatively thin non-puncturable circular band —6— preferably of spring sheet metal so as to maintain its circular form and still be able to yield radially at any point in its circumference. A circular tread —7— of elastic material such as soft rubber is fitted around and upon the periphery of the non-puncturable band —6— which together with the tread —7— forms a resilient demountable tread which is held in place by opposite duplicate clamping rings —8— and bolts —9—, the clamping rings being interchangeable with each other. The outer or tread portions of the casing sections —2— adjacent the band —6— are also provided with outwardly projecting flanges —10— for interlocking engagement with inturned flanges —11— on the inner edges of the clamping rings —8— for a purpose presently described.

The central portion of the outer shoe or casing composed of the sections —2— is provided with a central annular recess midway between its opposite edges forming radially projecting annular shoulders —12— in proximity to the flanges —10— for the reception and retention of the non-puncturable band —6—. The central portion of this band midway between its longitudinal edges is depressed inwardly to form a relatively wide annular rib of substantially the same width and radial depth as the recess in the periphery of the pneumatic casing, said band having its longitudinal edges extending laterally beyond the shoulders —12— and in fact a short distance beyond the longitudinal edges of the adjacent portion of the casing sections —2— and are adapted to rest upon annular shoulders —13— on the clamping rings —8— as shown more clearly in Fig. 3 so that when the clamping rings are placed in operative position, they serve to hold the band in exact concentricity with the axis of the rings or approximately in concentricity with the axis of the wheel. The outer edges or peripheries of these clamping rings —8— are also provided with inturned annular flanges —15— for interlocking engagement with corresponding annular flanges —16— on the adjacent edges of the elastic tread section —7— for the purpose of holding said tread section in operative position upon and concentric with the circular band —6—. These clamping rings —8— therefore serve not only to connect the elastic tread section —7— to the periphery of the pneumatic casing sections —2— but also serve to clamp the non-puncturable band —6— between said tread section and casing sections and are held in operative position by the clamping bolts —9— which are passed through registering apertures in the tread section —7— and clamping rings just outside of the periphery of the non-puncturable band —6—, the heads or nuts at the opposite ends of the bolts being countersunk so as to leave the outer surfaces of the rings as smooth as possible and to avoid shearing of the ends of the bolts by accidental contact with curbs, rails or other external objects.

The transverse width of the band —6— is substantially equal to the distance between the inner sides of the adjacent portions of the clamping rings —8— when the latter are interlocked with the flanges —10— and —16— of the casing sections —2— and tread —7— respectively and it is therefore evident that this band serves not only to prevent puncture of the pneumatic portion of the tire but also serves as a reinforcement to support the elastic tread —7— against undue radial compression inwardly and at the same time hold the periphery of the pneumatic casing sections —2— in exact concentricity with the axis of the band or wheel and resists any tendency to abnormal radial distention of the outer portion of the casing or inner tube —1—, said band also serving to limit the inward movement of the clamping rings toward each other beyond what is actually necessary to establish a firm connection between the shoe sections —2— and tread section —1— of the tire, thereby avoiding any undue compression of said casing sections or tread section.

Aside from the advantage of interchangeability of the clamping rings —8—, the same rings may be used on tires of different widths so long as the diameters remain the same, thereby obviating the necessity for separate clamping members for each different width of tire, although when the tires vary considerably in width, it will be necessary to use different widths of non-puncturable bands —6— and also different lengths of bolts —9—.

What I claim is:

In combination with the rim of a vehicle having inwardly extending flanges, a pneumatic tire having an envelop split circumferentially through one side, a pair of circumferential gripping flanges upon the inner side and upon the outer side, respectively, of said envelop, the flanges upon the inner side of the envelop engaging the flanges upon the rim, separate circular clamping rings having inner and outer edge flanges and a central offset portion, the inner edge flange of each ring engaging the gripping flanges, respectively, upon the outer side of the envelop, a circumferential depressed portion formed in the outer side of said envelop, a non-puncturable band seated upon the offset portion of said clamping rings and having a central depressed portion seated in the depressed portion of the envelop, a tread having flanges engaged by the respective flanges upon the outer side of the rings and means for holding said rings in operative position.

In witness whereof I have hereunto set my hand on this twentieth day of March 1912.

FREDERICK H. WILBUR.

Witnesses:
W. H. WINDUS,
FRANK WINDUS.